(12) United States Patent
Fitzgibbon

(10) Patent No.: US 11,921,253 B2
(45) Date of Patent: Mar. 5, 2024

(54) OBSTACLE DETECTION SYSTEMS AND METHODS

(71) Applicant: The Chamberlain Group LLC, Oak Brook, IL (US)

(72) Inventor: James J. Fitzgibbon, Batavia, IL (US)

(73) Assignee: THE CHAMBERLAIN GROUP LLC, Oak Brook, IL (US)

( * ) Notice: Subject to any disclaimer, the term of this patent is extended or adjusted under 35 U.S.C. 154(b) by 0 days.

(21) Appl. No.: 17/954,082

(22) Filed: Sep. 27, 2022

(65) Prior Publication Data
US 2023/0020944 A1 Jan. 19, 2023

Related U.S. Application Data

(63) Continuation of application No. 17/062,359, filed on Oct. 2, 2020, now Pat. No. 11,474,278, which is a continuation of application No. 16/047,846, filed on Jul. 27, 2018, now Pat. No. 10,823,879.

(51) Int. Cl.
*G01V 8/20* (2006.01)

(52) U.S. Cl.
CPC ...................... *G01V 8/20* (2013.01)

(58) Field of Classification Search
CPC ........ G01V 8/20; E05F 15/2076; E05F 15/77; E05F 15/603; E05F 15/60; G05B 19/00
See application file for complete search history.

(56) References Cited

U.S. PATENT DOCUMENTS

| | | | |
|---|---|---|---|
| 4,993,912 A | 2/1991 | King | |
| 5,309,212 A | 5/1994 | Clark | |
| 5,508,505 A | 4/1996 | Walts | |
| 5,596,840 A * | 1/1997 | Teich | E05F 15/43 49/26 |
| 5,729,003 A | 3/1998 | Briggs, III | |
| 6,612,493 B1 | 9/2003 | DeGiovine | |
| 6,624,899 B1 | 9/2003 | Clark | |
| 6,728,351 B2 | 4/2004 | Ahlstrom | |

(Continued)

OTHER PUBLICATIONS

Espros Photonics Corporation; Datasheet—EPC 600; 8x8 pixel 3D Tof imager; Datasheet epc610-v1.7; © 2014.

(Continued)

*Primary Examiner* — Georgia Y Epps
*Assistant Examiner* — Don J Williams
(74) *Attorney, Agent, or Firm* — Dority & Manning, P.A.

(57) ABSTRACT

An obstacle detection system includes a light emitter that emits a light signal and a light detector configured to receive a portion of the light signal reflected back from an object. The system includes a processor operatively coupled to the light emitter and the light detector to determine a presence of an obstacle based on the portion of the light signal received by the light detector. The system includes a heater operatively coupled to a power source and at least one sensor configured to determine an ambient temperature and an ambient relative humidity. The processor is operatively coupled to the power source, the heater, and the at least one sensor. The processor is configured to calculate a dew point of the environment from the ambient relative humidity and the ambient temperature and to activate the heater in response to the ambient temperature being less than the dew point.

18 Claims, 7 Drawing Sheets

(56) References Cited

U.S. PATENT DOCUMENTS

| | | |
|---|---|---|
| 6,748,061 B2 | 6/2004 | Ahlstrom |
| 6,989,767 B2 | 1/2006 | Fitzgibbon |
| 7,059,530 B2 | 6/2006 | Gagne |
| 7,154,377 B2 | 12/2006 | Gregori |
| 7,154,531 B2 | 12/2006 | Laird |
| 7,205,735 B2 | 4/2007 | Keller |
| 7,221,288 B2 | 5/2007 | Fitzgibbon |
| 7,253,890 B2 | 8/2007 | Miremadi |
| 7,332,999 B2 | 2/2008 | Fitzgibbon |
| 7,345,574 B2 | 3/2008 | Fitzgibbon |
| 7,432,676 B2 | 10/2008 | Keller |
| 7,798,411 B2 | 9/2010 | Gagne |
| 8,368,509 B2 | 2/2013 | Fitzgibbon |
| 8,410,930 B2 | 4/2013 | Karasek |
| 8,558,885 B2 | 10/2013 | Fitzgibbon |
| 8,584,401 B2 | 11/2013 | Planck |
| 8,648,695 B2 | 2/2014 | Fitzgibbon |
| 8,994,496 B2 | 3/2015 | Freese |
| 9,249,612 B2 | 2/2016 | Fitzgibbon |
| 9,331,626 B2 | 5/2016 | Davies |
| 9,449,510 B2 | 9/2016 | Saptharishi |
| 9,514,643 B2 | 12/2016 | Fitzgibbon |
| 9,574,387 B2 | 2/2017 | Jankovsky |
| 9,587,420 B2 | 3/2017 | Keller, Jr. et al. |
| 9,734,644 B2 | 8/2017 | Samad |
| 9,756,233 B2 | 9/2017 | Lee |
| 9,970,228 B2 | 5/2018 | Fitzgibbon |
| 10,156,634 B2 | 12/2018 | Fitzgibbon |
| 10,417,882 B2 | 9/2019 | Bretschneider |
| 10,563,456 B2 | 2/2020 | Bodurka |
| 10,597,928 B2 | 3/2020 | Cate |
| 10,679,476 B2 | 6/2020 | Bretschneider |
| 10,713,869 B2 | 7/2020 | Morris |
| 10,810,817 B2 | 10/2020 | Daniel-Wayman |
| 10,823,879 B2 | 11/2020 | Fitzgibbon |
| 10,837,216 B2 | 11/2020 | Cheng |
| 10,846,956 B2 | 11/2020 | Cate |
| 10,880,526 B2 | 12/2020 | Fitzgibbon |
| 11,040,841 B2 | 6/2021 | Olmsted |
| 11,111,714 B2 | 9/2021 | Baer |
| 11,275,196 B2 | 3/2022 | Bratton |
| 11,328,424 B1 | 5/2022 | Fitzgibbon |
| 11,474,278 B2 | 10/2022 | Fitzgibbon |
| 2003/0189415 A1 | 10/2003 | Fitzgibbon |
| 2005/0133699 A1 | 6/2005 | Miremadi |
| 2005/0207616 A1 | 9/2005 | Brad |
| 2008/0316306 A1* | 12/2008 | Burkle .............. B25J 9/1697 901/14 |
| 2009/0231427 A1 | 9/2009 | Fitzgibbon |
| 2012/0026836 A1 | 2/2012 | Scripca |
| 2014/0055234 A1 | 2/2014 | Tsui |
| 2015/0116672 A1 | 4/2015 | Woltman |
| 2017/0059708 A1 | 3/2017 | Fitzgibbon |
| 2019/0271185 A1* | 9/2019 | Fitzgibbon .............. E05F 15/41 |
| 2021/0018651 A1 | 1/2021 | Fitzgibbon |

OTHER PUBLICATIONS

Espros Photonics Corporation; Handbook—EPC 600; Time-of-flight range finder clip; © 2014; http://www.espros.ch/documents/10156/97990958-990c-446f-bb59-1f8d040f328e; 28 pages.

Mark G. Lawrence; The Relationship Between Relative Humidity and the Dewpoint Temperature in Moisae Air—A Simple Conversion and Applications; american Meteorological Society, Feb. 2005; 10 pages.

Seltec Automation & Control Distrubutors; Sick PL50HK (1011545) Reflector Heated (continuous) retrieved from http://www.seltec.co.uk/products/details/11866.html on Apr. 18, 2018.

TM Optics for Industry; IMOS Triheater, Heated Anti-Fog Reflector, retrieved from https://www.imos-gubela.com/en/triheater/ on Apr. 18, 2018.

U.S. Appl. No. 16/047,846; Notice of Allowance dated Jun. 29, 2020, (pp. 1-8).

U.S. Appl. No. 17/062,359; Notice of Allowance and Fees Due (PTOL-85) dated Jun. 13, 2022; (pp. 1-8).

U.S. Appl. No. 16/047,846; Non-Final Office Action dated Feb. 29, 2020; (pp. 1-15).

U.S. Appl. No. 17/062,359; Notice of Allowance dated Jun. 13, 2022; (pp. 1-13).

* cited by examiner

OBSTACLE DETECTION SYSTEMS AND METHODS

CROSS-REFERENCE TO RELATED APPLICATIONS

This application is a continuation of U.S. patent application Ser. No. 17/062,359, filed Oct. 2, 2020, which is a continuation of U.S. patent application Ser. No. 16/047,846, filed Jul. 27, 2018, which issued as U.S. Pat. No. 10,823,879 on Nov. 3, 2020, which are all hereby incorporated by reference in their entireties herein.

TECHNICAL FIELD

The present disclosure relates generally to movable barrier operators, and more specifically, to obstacle detection systems for movable barrier operators.

BACKGROUND

Various types of movable barrier operators are used to control the position of corresponding movable barriers. Movable barriers generally limit access to a secured area by selectively obstructing an opening that leads to the secured area. Movable barriers may include single-panel and segmented garage doors, horizontally or vertically pivoting or sliding doors or gates, and rolling shutters.

For numerous reasons, an obstacle may be in the path of a movable barrier. For example, an object may be left on a floor of a garage in the path of the garage door. It is known to use obstacle detection systems to detect an obstacle in the path of the movable barrier (particularly when the movable barrier moves toward a closed position) through the use of light (e.g., laser and infrared photobeams), sound, radio frequency, and/or contact-sensing mechanisms. Upon sensing an obstacle, the obstacle detection system provides a signal that can be used by the movable barrier operator to aid in limiting or avoiding contact between the movable barrier and the detected obstacle. For example, the movable barrier operator may respond by stopping and/or reversing barrier movement.

Modern movable barrier operators typically use one or more techniques to facilitate automated detection of such obstacles. Common techniques include the use of an infrared beam disposed to detect the presence, when the beam is broken, of an obstacle in the pathway of the movable barrier. At least one difficulty associated with this technique is mounting an emitter and detector on opposing sides of the opening associated with the movable barrier. The mounting procedure takes time due to alignment of and, in some applications, routing of wires to the emitter and detector.

Retro-reflective systems utilize an emitter and a detector on the same side of the opening of the movable barrier. Further, retro-reflective systems have a reflector on the opposite side of the opening associated with the movable barrier, such that the reflector is aligned to reflect the emitted signal which traversed from one side (e.g., left or right side) of the opening to the opposite side (e.g., right or left side) of the opening back to the detector. However, such systems entail additional installation time to set up the reflector on the opposing side of the movable barrier. If the reflector becomes misaligned after installation, the movable barrier operator system may enter an error mode and will not close the movable barrier because the detector will be unable to receive the light beam reflected back from the reflector. To remedy this situation, a user will have to recognize the alignment issue and realign the reflector. Some users may call a repair service to troubleshoot the non-operating movable barrier operator which involves additional time and expense.

Further, some obstacle detection systems have reflectors that are susceptible to moisture build-up from morning dew, fog, rain, or other environmental conditions. The location of the obstacle detection system may also cause moisture to condense on a surface of the reflector which interferes with the ability of the reflector to reflect light back to the detector. Such locations may include cold-storage facilities, warehouses, breweries, and large garages. The moisture build-up and resulting interference with the light beam may cause the obstacle detection system to malfunction. Malfunctions in the obstacle detection system due to condensation on the reflector may cause frustration and result in unnecessary service calls.

The use of an anti-fog coating is one possible solution to the condensation problem on reflectors of an obstacle detection system. However, anti-fog coatings, such as those used on eyeglasses and face shields, are normally exposed to outside elements for only limited periods of time. In contrast, the reflector, lens, or collimator of an obstacle detection system may be exposed to the outside elements for their entire operating lifetimes. In addition, condensation on lenses or face shields is caused from a temporary change in temperature or even a user's exhalation. Because the condensation on the reflector is caused from the ambient temperature dropping and remaining below the dewpoint, larger particles of water may collect on the susceptible surfaces of the reflector. Therefore, such anti-fog coating, which may be suitable for lenses and face masks, may not be appropriate for the surfaces of an obstacle detection system.

Wired heated reflectors are known in the industry, such as the PL50HK heated reflector sold by SICK and the Triheater anti-fog reflector sold by IMOS®. These heaters may prevent condensation from accumulating on the reflector. However, these heaters require a wired power source which complicates installation and may not be suitable for some applications.

Additionally, motion detection cameras for object detection are known in the art. These cameras monitor an area much larger than the path of the movable barrier. Therefore, many objects, including an automobile parked in the garage, may be in the camera's monitoring area and make it difficult to identify objects in the movable barrier's path, as opposed to merely present in the larger monitoring area. Further, such cameras are time-consuming to install and integrate into a movable barrier operator system.

Figure 1:
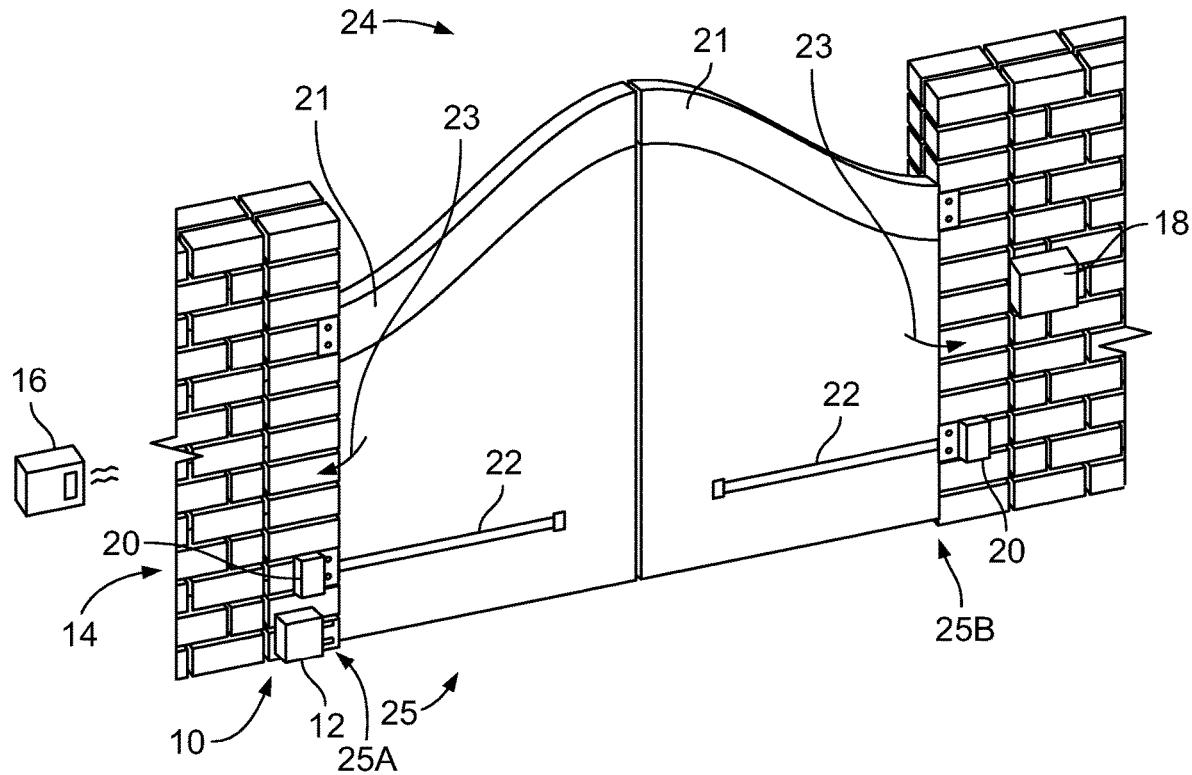
FIG. 1 is a perspective view of an example obstacle detection system of a movable barrier operator.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of the various embodiments. It will further be appreciated that certain actions and/or steps may be described or depicted in a particular order of occurrence while those skilled in the art will understand that such specificity with respect to sequence is not actually required.

DETAILED DESCRIPTION

In accordance with one aspect of the present disclosure, an obstacle detection system is provided that includes a first light emitter configured to emit a light signal, and a first light detector configured to receive a portion of the light signal reflected back from an object. The obstacle detection system further includes: a second light emitter configured to emit a test signal toward the first light detector; and a second light detector configured to detect a light signal emitted by the first light emitter. The obstacle detection system includes a processor operatively coupled to the first light emitter, the first light detector, the second light emitter, and the second light detector. The processor is configured to determine whether the first light emitter and the first light detector are operable by use of the second light emitter and the second light detector. The first and second light emitters and detectors allow the obstacle detection system to operate without the need for a reflector (or any other object) on the opposite side of the movable barrier opening but still provide a failsafe to detect whether the first light emitter, the first light detector, or both, malfunction. Not having to install a reflector improves the ease of installation of the system.

In another aspect of the present disclosure, an obstacle detection system is provided that includes a light emitter configured to emit a light signal, and a light detector configured to receive a portion of the light signal reflected back from an object. The obstacle detection system includes a processor operatively coupled to the light emitter and the light detector to determine a presence of an obstacle based on the portion of the light signal received by the light detector. The obstacle detection system includes a heater operatively coupled to a power source and at least one sensor configured to determine an ambient temperature and an ambient relative humidity. The processor is operatively coupled to the power source, the heater, and the at least one sensor. In one embodiment, the power source includes a battery or a solar panel with a battery for storage of power. The processor is configured to calculate a dew point of the environment from the ambient relative humidity and the ambient temperature. If the ambient temperature is less than or equal to the calculated dew point, then the processor activates the heater. In this manner, the obstacle detection system may operate the heater to raise the temperature of a component of the obstacle detection system, such as a reflector, and cause water on the component to evaporate. The heater may thereby inhibit moisture build-up in the form of condensation, dew, fog, rain, or frost on the component and limit interference in the transmission and reception of the light signal due to moisture build-up.

In yet another aspect of the present disclosure, an obstacle detection system is provided that includes a light emitter which emits a light signal across the opening of the movable barrier. The obstacle detection system further includes a camera having a field of view adjacent an opening. The camera is configured to monitor a zone of interest of the field of view, the zone of interest being associated with the light signal. The field of view may thereby be narrowed down to the zone of interest, which extends across the opening of the movable barrier on opposite lateral sides of the light signal. The zone of interest may also extend across the opening of the movable barrier above the light signal. The zone of interest may be more important than the rest of the field of view to determine whether an obstacle obstructs the path of a movable barrier. The processor is operatively coupled to the camera and is configured to determine whether the opening is obstructed by detecting if an object is in the zone of interest. Because less than the entire field of view of the camera is monitored for an object, objects in the field of view but outside of the zone of interest (e.g., a parked car in a garage) may not cause the processor to transmit a signal to a movable barrier operator indicating an object obstructs the path of the movable barrier.

In one embodiment, the light emitter is configured to be mounted at a vertical position above a floor of the opening and the zone of interest has a height extending above the vertical position of the light emitter. Because the zone of interest extends above the vertical position of the light emitter, the camera may determine whether an object above the vertical position of the light emitter obstructs the path of the movable barrier. For example, a front or rear portion (e.g., bumper) of a vehicle that has not been fully parked in a garage may extend into the travel path of the garage door. The bumper of the vehicle may be above the vertical position of the light emitter such that the bumper does not interrupt the light beam. However, the camera detects the bumper in the zone of interest above the light beam and the processor transmits a signal to the movable barrier indicating an object obstructs the path of the movable barrier.

With reference to FIG. 1, an obstacle detection system 10 is provided that is a component of movable barrier operator system 14. The movable barrier operator system 14 includes a movable barrier operator 18 having gate motors 20 coupled to gate arms 22. Each gate arm 22 is coupled to a gate segment 21 of gate 24. Gate segments 21 pivot, swing or otherwise move together to close a movable barrier opening 25. The movable barrier operator system 14 includes one or more remote controls such as a transmitter 16. The transmitter 16 is operable to send an encoded control signal to the movable barrier operator 18 and cause the gate arm motors 20 to retract the gate arms 22 in directions 23 and open the gate 24. The one or more remote controls may include one or more of, for example, a keyfob-style transmitter, a keypad transmitter mounted in a vehicle or near the gate 24, a vehicle infotainment system, and a portable electronic device such as a smartphone, a smartwatch, a tablet computer, or personal computer (PC), such as a laptop.

Figure 2:
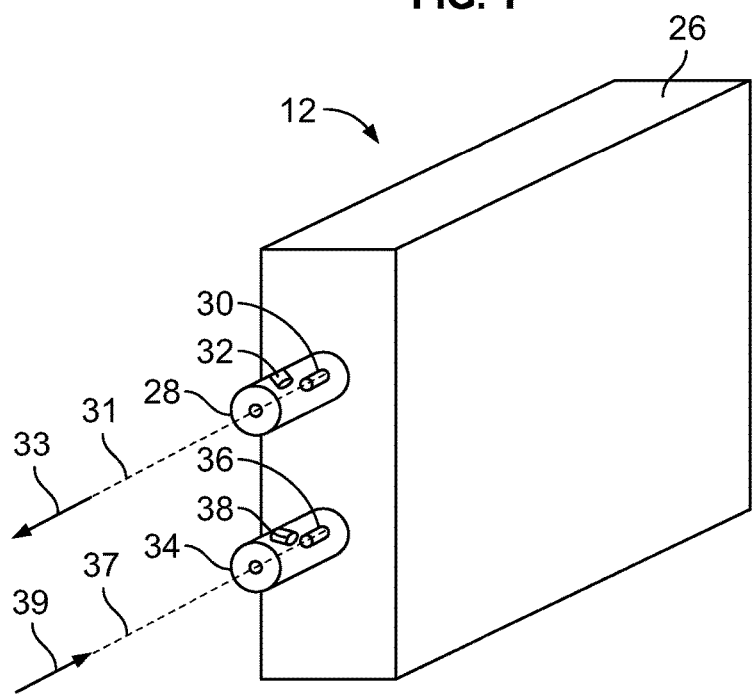
FIG. 2 is a perspective view of an example obstacle detector of the obstacle detection system of FIG. 1 showing light emitters and light detectors of the obstacle detector.

Regarding FIGS. 1 and 2, the obstacle detection system 10 detects whether an object is in the path of the gates 24. The obstacle detector 12 includes a first collimator 28 and a first light emitter 30. The first collimator 28 collimates a light signal generated by the first light emitter 30 into a beam directed along axis 31 in direction 33. The obstacle detector 12 includes a second collimator 34 and a first light detector 36. The first light emitter 30 is configured to emit a wide-angle photobeam. In some embodiments, the angle may be at least 7 degrees, in a range of 1 to 10 degrees, in a range of 1 to 5 degrees, or in a range of 1 to 3 degrees. In one embodiment, the angle of a spread the photobeam may be in a vertical plane relative to an axis (e.g., axis 31). In another embodiment, the angle of the spread of the photobeam may be in a horizontal plane relative to an axis. In yet another embodiment, the angle of the spread of the photobeam may be in both the horizontal and vertical planes relative to an axis. In another embodiment, the first light emitter 30 is configured to emit a narrow or focused beam (e.g., laser). The collimators 28, 34 may be an internal component of the obstacle detector 12 or may protrude from the obstacle detector 12.

The light signal from the first light emitter 30 is reflected back to the first light detector 36 in a general direction 39 from an object obstructing the movable barrier opening 25. The light signal received at the first light detector 36 may be only a portion of the light signal emitted from the first light emitter 30. The second collimator 34 collimates the reflected light signal generally along an axis 37 and directs the light signal toward the first light detector 36.

Referring to FIG. 2, the obstacle detector 12 includes a second light detector 32 in the first collimator 28. The second light detector 32 is off-axis or coaxial relative to axis 31 and is configured to detect the light signal emitted from the first light emitter 30, such that the second light detector 32 may test whether the first light emitter 30 is operable. The obstacle detector 12 further includes a second light emitter 38 in the second collimator 34. The second light emitter 38 is off-axis or coaxial relative to the axis 37 and is configured to emit a test signal toward the first light detector 36, such that the second light emitter 38 may test whether the first light detector 36 is operable.

In one embodiment, the first light emitter 30 and the first light detector 36 are housed in the same component, as seen in a retroreflective system. In another embodiment, the first light emitter 30 and the first light detector 36 are housed in separate components. For example, in a thru-beam object detection system, the first light emitter 30 is housed in a component on one side 25A of the movable barrier opening 25 and the first light detector 36 is housed in another component on the opposite side 25B of the movable barrier opening 25. The first light emitter 30 and the first light detector 36 of the thru-beam detection system would be positioned on an interior or an exterior of a supporting structure, such as a fence post, a wall, or a door frame.

Figure 3:
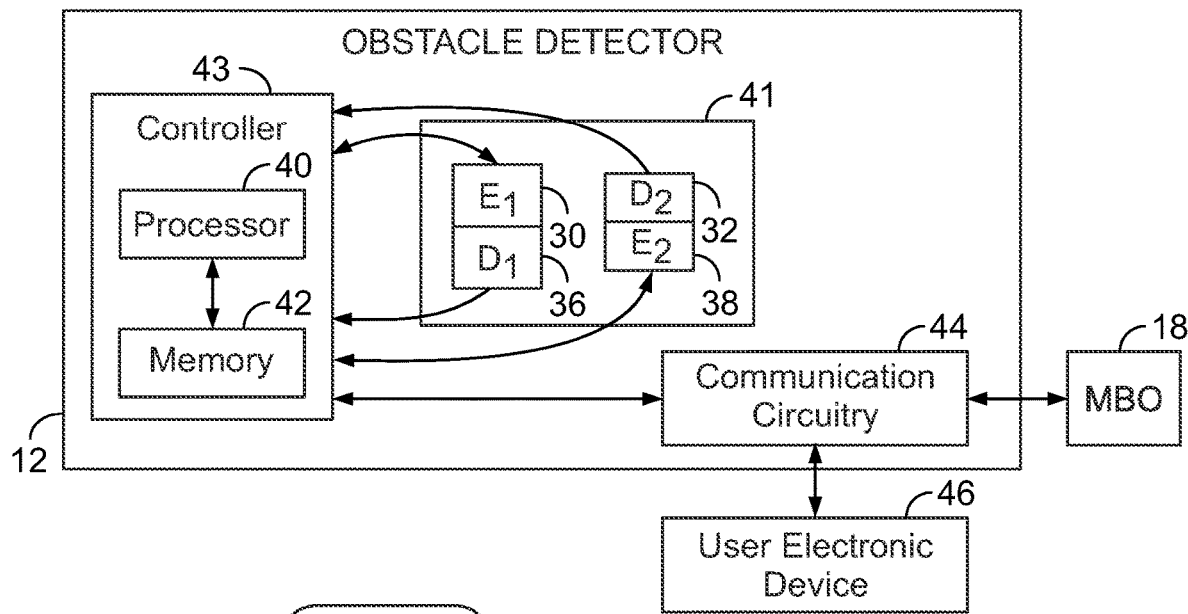
FIG. 3 is a block diagram of the example obstacle detection system of FIG. 1.

Turning to FIG. 3, the obstacle detector 12 includes a controller 43 having a processor 40 and a memory 42. The controller 43 is in communication with optical circuitry 41 which includes the first light emitter 30, first light detector 36, second light detector 32, and second light emitter 38. The first light detector 30, as well as the second light emitter 38 and the second light detector 32 are also in either wired communication or wireless communication with the processor 40 such that the processor 40 may receive and transmit information to and from the first light detector 36, the second light emitter 38, and the second light detector 32. The controller 43 is configured to operate the obstacle detector 12 in a set-up mode, an operating mode, a rest mode, and a failure mode, which are addressed below.

In one embodiment, wired connectors are employed between the controller 43 and the optical circuitry 41. In another example, the first light emitter 30 and the first light detector 36 are positioned on opposite sides of the movable barrier opening 25, and the communication circuitry 44 facilitates communication between the processor 40 and the optical circuitry 44 using Wi-Fi or Bluetooth. The controller 43 is also in communication with the communication circuitry 44 which communicates with the movable barrier operator 18. The communication circuitry 44 may communicate using at least one of Bluetooth, Wi-Fi, and an input-output (I/O) Interface. The communication circuitry 44 may communicate with a user's electronic device 46 via a wireless, internet, and/or wide-area network (e.g. cellular network) to inform the user of when the obstacle detection system 10 enters the failure mode or detects an obstacle. The electronic device 46 may be, for example, a personal computer, a laptop computer, a tablet computer, a smartphone, and a vehicle infotainment system.

The memory 42 may store a baseline time value. This baseline time value represents the time for a light signal to traverse the movable barrier opening 25. For example, the time elapsed from the first light emitter 30 emitting a light signal, the light signal traveling unobstructed across the movable barrier opening 25, the light signal traveling back across the movable barrier opening 25, to the first light detector 36 receiving at least a portion of the light signal. In other embodiments, the baseline time value represents the time elapsed from the first light emitter 30 emitting a light signal, the light signal traveling unobstructed across the movable barrier opening 25, and the first light detector 36 receiving at least a portion of the light signal.

To configure the obstacle detector 12, a button of the obstacle detector 12 may be actuated (e.g., by a user, owner or installer), or the electronic device 46 may be employed to cause the obstacle detector 12 to enter a set-up mode where the baseline time value is calculated by calibrating the obstruction detection system 10. For example, the user positions an object, such as a box, across the opening of a movable barrier 25 from the first light emitter 30 before initializing the set-up mode of the obstacle detector 12. The first light emitter 30 emits a light signal, the light signal travels across the movable barrier opening 25 to the box, the light signal is reflected back across the movable barrier opening 25, and the first light detector 36 receives the light signal. The processor 40 calculates the duration of the time from when the first light emitter 30 emitted the light signal until the first light detector 36 received the reflected light signal. After calculation of the baseline time value, the object may be removed. In one approach, the object, such as a retroreflector, may remain on the other side of the movable barrier opening 25. In another approach, the controller 43 determines the baseline time value based on information from the user, such as a distance across the opening 25.

After set-up mode is complete, the obstacle detector 12 enters the operating mode. The first light emitter 30 may periodically transmit light signals or, in another approach, transmits light signals upon the movable barrier operator 14 receiving an operate command from the transmitter 16. Based on information from the first light emitter 30 and the first light detector 36, the processor 40 determines a time-of-flight (TOF) as the length of time from an emission of a light signal by the first light emitter 30 to the receipt of the light signal by the first light detector 36. The TOF is compared to the baseline time value. If the TOF is less than the baseline time value, the light signal has reflected off an object in the movable barrier opening 25 and an obstruction is detected. If the TOF is equal or greater to the baseline time value, then no obstruction is detected. If the time-of-flight is inconclusive (because a portion of the light signal was not received by the first light detector 36), then the obstacle detector 12 enters test mode (and possibly failure mode) addressed below in FIG. 5. The obstacle detection system 10 enters the rest mode when light signals are not to be transmitted by the first light emitter 30.

Figure 4:
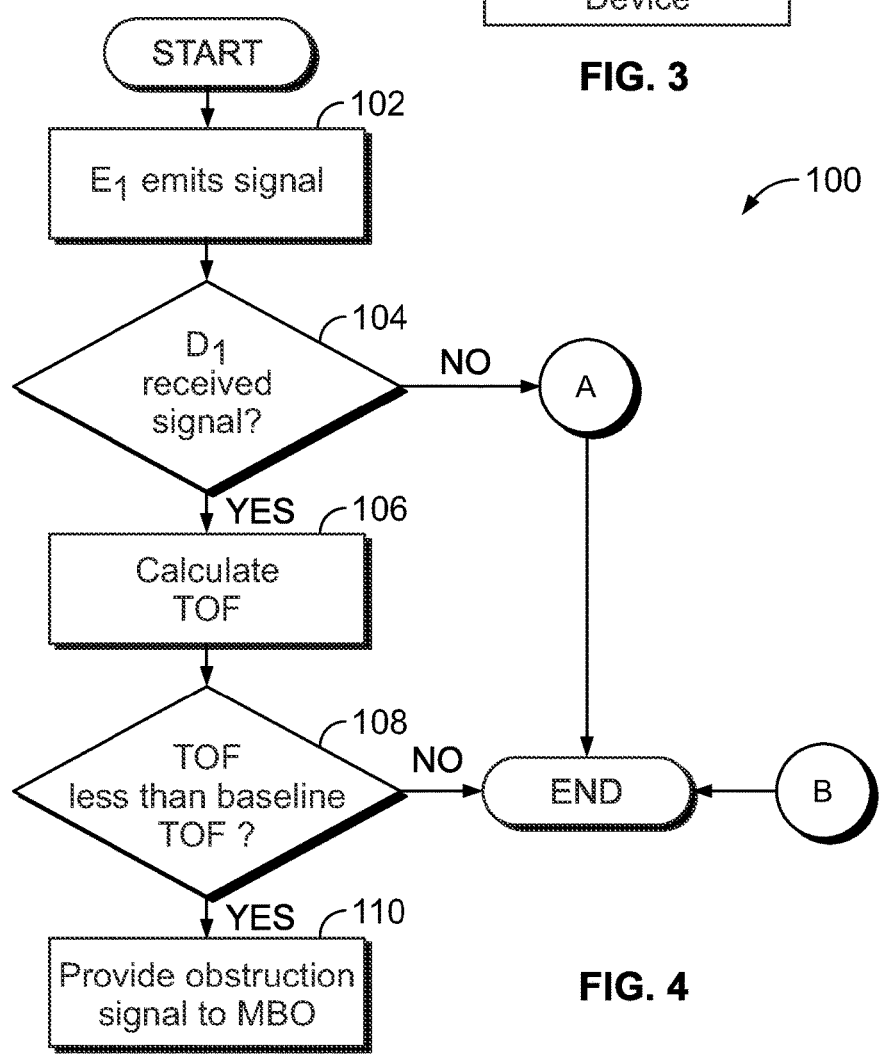
FIGS. 4 and 5 are portions of a flow diagram of an example method of operating the obstacle detection system of FIG. 1.

Referring to FIG. 4, an example of method 100 for detecting an obstacle using the obstacle detection system 10 includes the first light emitter 30 emitting 102 a light signal and determining 104 whether the first light detector 36 received at least a portion of the light signal. In response to determining that the first light detector 36 received no portion of the light signal, the obstacle detection system 10 enters the test mode (discussed below with respect to FIG. 5).

In response to determining 104 that the first light detector 36 received a portion of the light signal from the first light emitter 30, the method 100 further includes calculating 106 a TOF for the light signal as the duration of time from the emission 102 of the signal by the first light emitter 30 to the receipt of the light signal by the first light detector 36. The method 100 further includes the processor 40 determining 108 whether the TOF is less than or equal to the baseline time value.

In response to determining 108 that the TOF is less than the baseline time value, the method 100 further includes providing 110 an obstruction signal to the movable barrier operator 18. The communication circuitry 44 provides 110 the obstruction signal to the movable barrier operator 18 using wired or wireless approaches discussed above. The movable barrier operator 18 stops and/or reverses the movement of the gate 24 in response to receiving the obstruction signal from the obstacle detector 12.

In response to determining 108 that the TOF is equal to or greater than the baseline time value, the method 100 concludes without providing 110 the obstruction signal to the movable barrier operator 18.

In one embodiment, the light signals are emitted from the first light emitter 30 at spaced intervals not less than the baseline time value. However, it may be desirable to distinguish one light signal from another. For example, if a first light signal is emitted from the first light emitter 30 but does not reflect back to the first light detector 36 until after a second light signal is emitted, the receipt of the first light signal may be mistaken as the receipt of the second light signal. Therefore, if the light signals have unique identifying characteristics, then signals can be discerned from one another. The unique characteristics may be modulation characteristics and may include amplitude, frequency, phase, pule sequence, and pulse duration.

Figure 5:
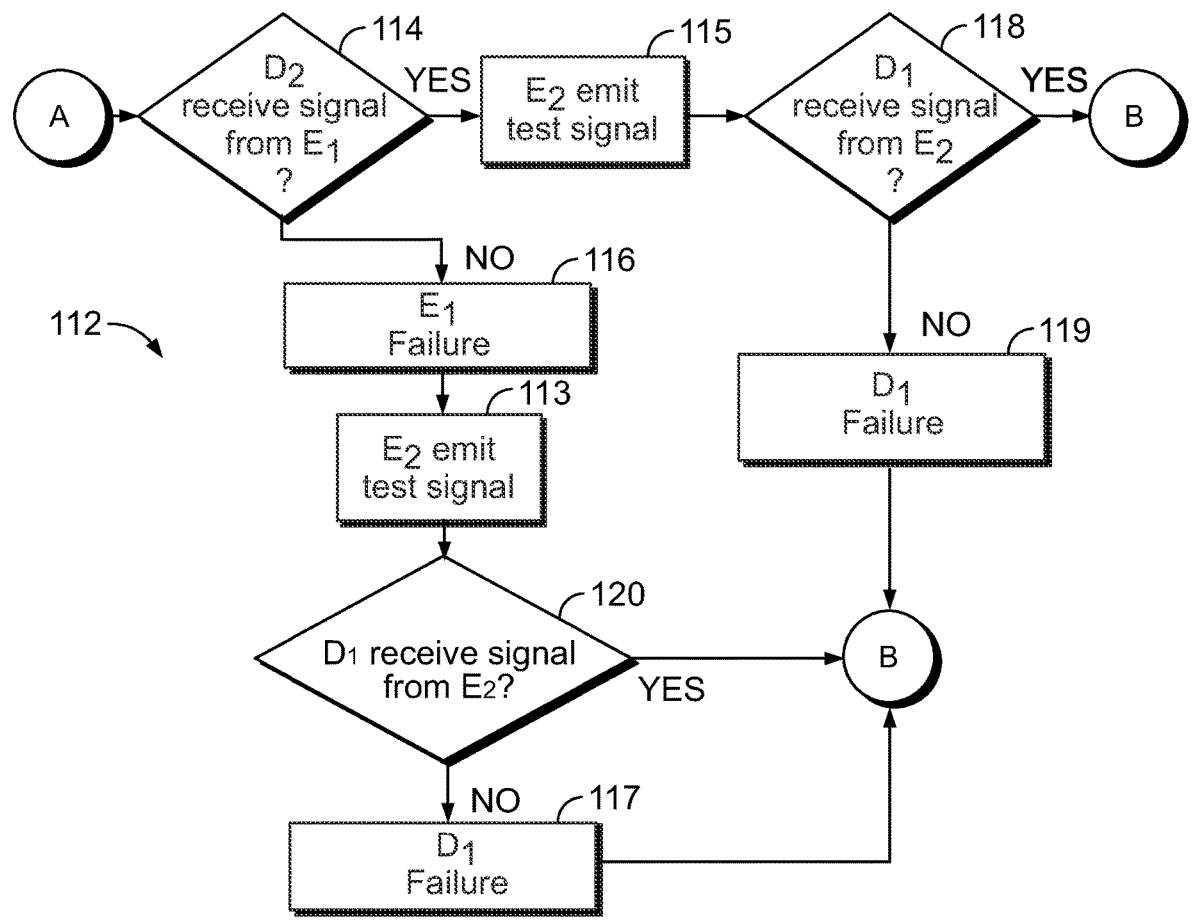

Referring now to FIG. 5, if the first light detector 36 did not receive at least a portion of the signal at step 104, the obstacle detector 12 enters the test mode and performs method 112. The method 112 allows the obstacle detection system 10 to check whether the first light emitter 30 and the first light detector 36 are operable. The method 112 includes the processor 40 determining 114 whether the second light detector 32 received a portion of the light signal from the first light emitter 30. The determining 114 may include the processor 40 directing the first light emitter 30 to transmit a second light signal and operating the second light detector 32 to detect the second light signal.

In response to determining 114 that the second light detector 32 did not receive at least a portion of the second light signal, the method 112 further includes the processor 40 concluding 116 that the first light emitter 30 has failed. At step 116, the processor 40 causes the communication circuitry 44 to send a failure signal to the movable barrier operator 18, the failure signal indicating failure of the first light emitter 30. The movable barrier operator 18 enters an error mode that inhibits closing of the gate 24 in response to receiving the failure signal from the obstacle detector 12. The movable barrier operator 18 remains in the error mode until the failure of the light emitter 30 has been remedied. For example, after a user has replaced the first light emitter 30 and subsequently positions an object (e.g., the user's hand) in the path of the light beam, the obstruction signal provided 110 to the movable barrier operator 14 may reset the movable barrier operator 18 and permit normal movement of the gates 24.

After sending 116 the failure signal indicating failure of the first light emitter 30, the method 112 includes the second light emitter 38 emitting 113 a test signal. The method 112 further includes determining 118 whether the first light detector 36 received a portion of the test signal from the second light emitter 38. In response to determining 118 that the first light detector 36 did not receive at least a portion of the test signal, the method 112 further includes the processor 40 concluding 117 that the first light detector 36 has failed. The step 117 includes the processor 40 causing the communication circuitry 44 to send a failure signal to the movable barrier operator 18, the failure signal indicating failure of the first light detector 36. The movable barrier operator 18 then enters an error mode as discussed above which inhibits closing of the gates 24.

In response to determining 120 that the first light detector 36 received at least a portion of the test signal, the method 112 finishes having concluded that only the first light emitter 30 has failed. The first light detector 36 remains operable.

If, at step 114, the processor 40 determines that the first light emitter 30 is operable, the method 112 includes the second light emitter 38 emitting 115 a test signal. The method 112 further includes determining 118 whether the first light detector 36 received at least a portion of the test signal from the second light emitter 38. In response to determining 118 that the first light detector 36 did not receive at least a portion of the test signal, the method 112 further includes the processor 40 concluding 119 that the first light detector 36 has failed. The step 119 includes the processor 40 causing the communication circuitry 44 to send a failure signal to the movable barrier operator 18, the failure signal indicating failure of the first light detector 36. The movable barrier operator 18 enters the error mode discussed above and inhibits closing of the gate 24.

In response to determining 118 that the first light detector 36 did receive the test signal from the second light emitter 38 after determining 114 that the second light detector 32 did receive at least a portion of the signal from the first light emitter 30, the processor reverts from method 112 to method 100 to conclude without providing 110 the obstruction signal to the movable barrier operator 18 because both the first light emitter 30 and the first light detector 36 are operable. In this manner, the obstacle detector 12 can be mounted on one side of the movable barrier opening 25 without a reflector being positioned on the other side of the movable barrier opening 25. This is because, if the first light detector 36 does not receive the light signal emitted from the first light emitter 30, the processor 40 can perform the method 112 to determine whether the first light detector 36 did not receive the light signal because no object obstructs the opening 25 or whether either of the first light emitter 30 and the first light detector 36 have failed.

In various embodiments, the communication circuitry 44 of the obstacle detection system 10 may additionally send one or more failure signals to a user's electronic device 46 or another remote resource such as a server computer.

Figure 6:
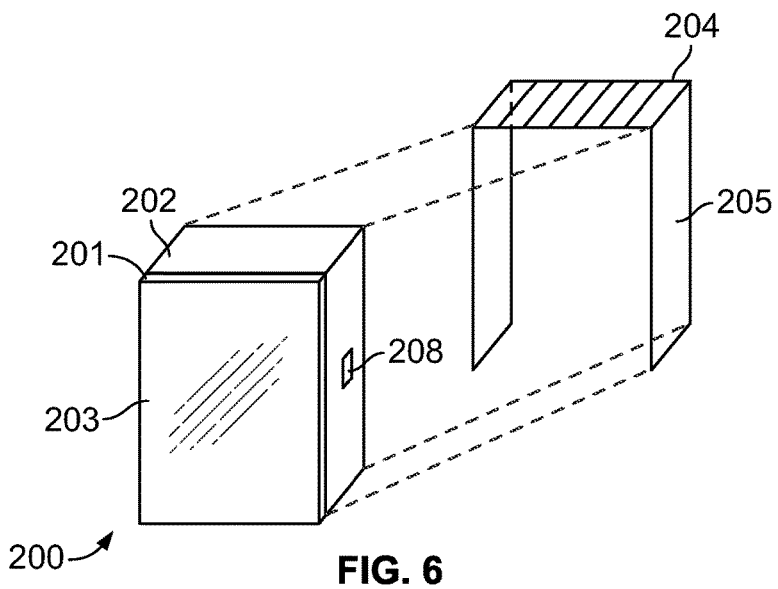
FIG. 6 is a partially exploded view of an example reflector having a heater and a solar panel for powering the heater.

The obstacle detection system 10 may include a heated component. For example, although the obstacle detector 12 does not employ a reflector on the opposite side of the opening 25, the obstacle detection system 10 may include a heated reflector 200 as shown in FIG. 6 to reflect the light beam back to the first light detector 36. The reflector 200 may include a reflective material 201, a transparent material 203 covering the reflective material 201, and a heater 202. The heater 202 is operatively coupled to the reflective material 201 and to the transparent material 203 so that energizing the heater 202 raises the temperature of one or both of the reflective material 201 and the transparent material 203. For example, the heater 202 may include heating elements in the reflective material 201. In one embodiment, the reflector 200 does not include the transparent material 203 and the heater 202 is operable to raise the temperature of the reflective material 201.

In one embodiment, a solar panel 204 is part of a reflector hood 205 that may fit over the reflector 200 and the heater 202. In another embodiment, the solar panel 204 is installed at a different location than the reflective material 201. For example, if the heater 202 and the reflector 200 are in a shady area, the solar panel 204 may be provided on an existing support (such as a pole, fencepost, wall) or on a new support (such as a stake or the like) that can be installed at a location where the solar panel 204 will receive more exposure to the sun. In another embodiment, the power source of the reflector 200 is a battery 208. In yet another embodiment, the power source of the reflector 200 may be an electrical mains.

Figure 7:
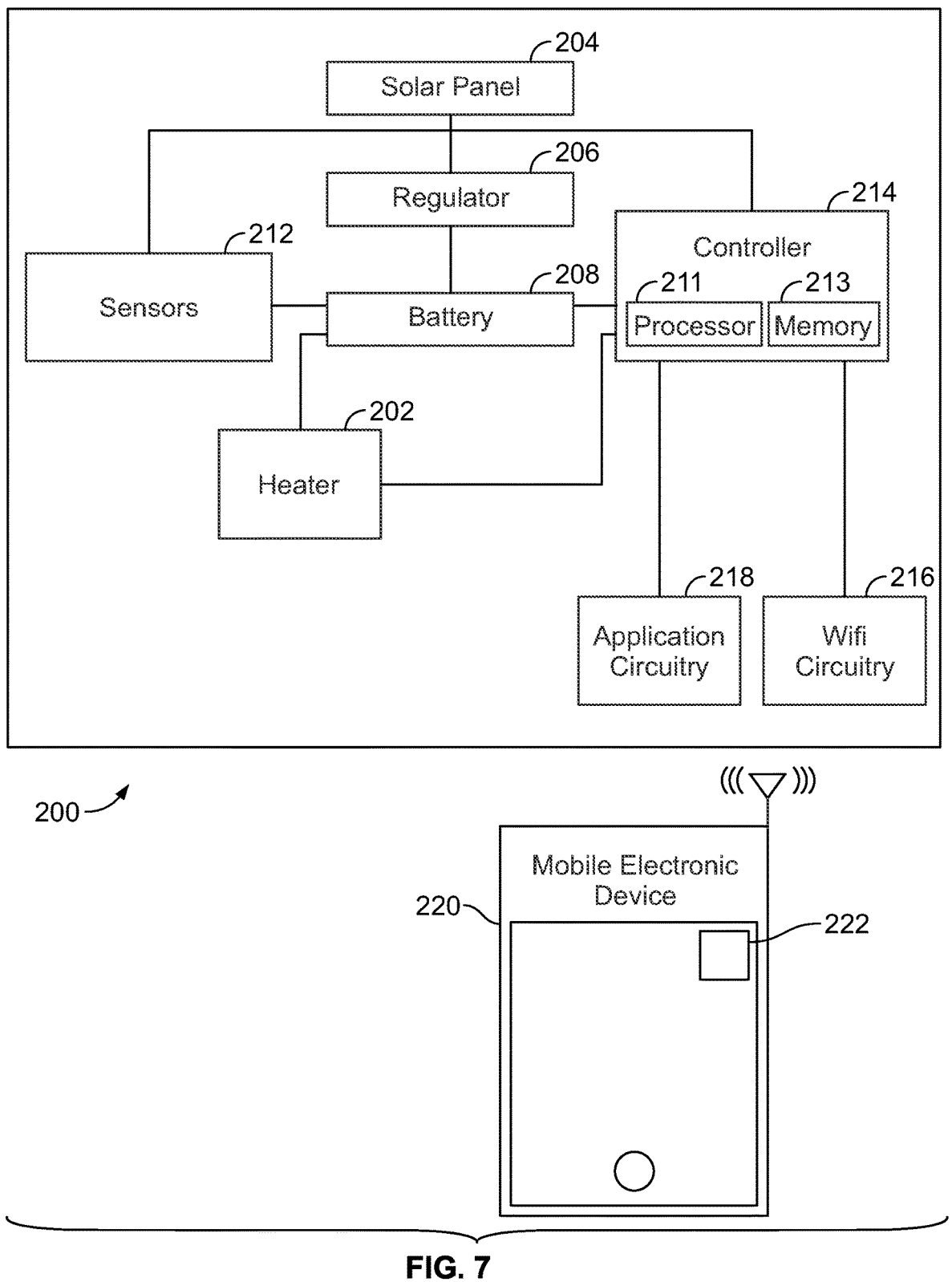
FIG. 7 is a block diagram of the example reflector of FIG. 6 communicating with a mobile electronic device.

Turning to FIG. 7, the reflector 200 includes a regulator 206 to regulate voltage and/or current from the solar panel 204 for storage in the battery 208. When the heater 202 receives electrical current from the battery 208, the heater 202 converts the electrical current into heat.

The reflector 200 further includes at least one sensor 212, such as temperature and humidity sensors. The at least one sensor 212 measures an ambient temperature and an ambient relative humidity from the environment around the obstacle detection system 10.

When the solar panel 204 is exposed to sunlight, the at least one sensor 212 receives electric power to operate from the solar panel 204. When the solar panel 204 is not exposed to sunlight, the at least one sensor 212 receives electric power to operate from the battery 208. If the solar panel 204 is not used, the at least one sensor 212 receives electric power from the battery 208.

Regarding FIG. 7, the reflector 200 includes a controller 214 coupled to the solar panel 204 and the battery 208. The controller 214 includes a processor 211 a memory 213. When the solar panel 204 is exposed to sunlight, the processor 214 receives electric current to operate from the solar panel 204. When the solar panel 204 is not exposed to sunlight, the processor 214 may receive electric power to operate from the battery 208. In an embodiment where solar panel 204 is not used, processor 214 may receive electric power from the battery 208.

The controller 214 is in communication with the at least one sensor 212 and receives data that is representative of or derived from the measurements taken by the at least one sensor 212. The controller 214 calculates the dew point from the ambient temperature and the ambient relative humidity measured by the at least one sensor 212. Relative humidity is the amount of moisture in the air compared to what the air can "hold" at a given temperature. The dew point is the temperature at which the relative humidity is equal to 100%. The dew point in degrees Celsius may be calculated from the following equation: $T_d = T - ((100 - RH/5))$, where $T_d$ is the dew point, T is the ambient temperature, and RH is the relative humidity.

The controller 214 compares the ambient temperature to the calculated dew point. If the ambient temperature is below the dew point, then the controller 214 activates the heater 202 to prevent condensation from forming on the transparent material 203 or the reflective material 201 of the reflector 200. Upon activation, the heater 202 draws current from the battery 208 and converts the current to heat. Although the ambient temperature is below the dew point, the surface of the heated reflective material 201 or transparent material 203 is heated above the dew point so that any excess water vapor in the ambient air will not condense on the surface of the reflective material 201 or transparent material 203. When the controller 214 calculates that the ambient temperature is above the dew point, the controller 214 will not activate the heater 202 (or will deactivate the heater 202 if currently energized) such that the heater 202 does not draw current from the battery 208. Heating the reflective material 201 or transparent material 203 is not needed because the temperature of the surface of the reflective material 201 or the transparent material 203 would not be below the dew point.

In some embodiments, the reflector 200 may also include communication circuitry for communication with other devices. For example, the reflector 200 may include Wi-Fi circuitry 216 for communication with a network access point such as a Wi-Fi router for communicating with the internet. The reflector 200 may include application circuitry 218 for communication with specific applications or devices such as the obstacle detector 12 or the movable barrier operator 18. A user may receive information regarding the reflector 200 from a mobile electronic device 220 that operates an application 222 and receives information from the reflector 200 such as via the movable barrier operator 18. Through the application 222, a user may monitor certain aspects of the obstacle detection system 10 including ambient temperature, ambient relative humidity, whether the heater 202 is turned on or off, whether an obstacle has been detected, and an obstacle detection history log. Additionally, the user may be able to control certain aspects of the obstacle detection system 10 including setting a schedule for automatically activating and deactivating the heater 202. The reflector 200 may utilize battery efficient wireless protocols such as Bluetooth low energy, ANT, and ZigBee to communicate with one or more devices.

In another embodiment, other components of the obstacle detection system 10 may include a heating system like the reflector 10. For example, the obstacle detector 12 may include a heater configured to heat one or more light-transmitting materials, such as lenses of the first light emitter 30 and the first light detector 36, in response to the ambient temperature being below the dew point. It will be appreciated that the heater can be used to raise the temperature of any light-transmitting or reflective material to remove or prevent condensation, dew, fog, rain, frost, or other type of moisture build-up which could inhibit travel of or otherwise degrade transmission or reception of the light signal.

Figure 8:
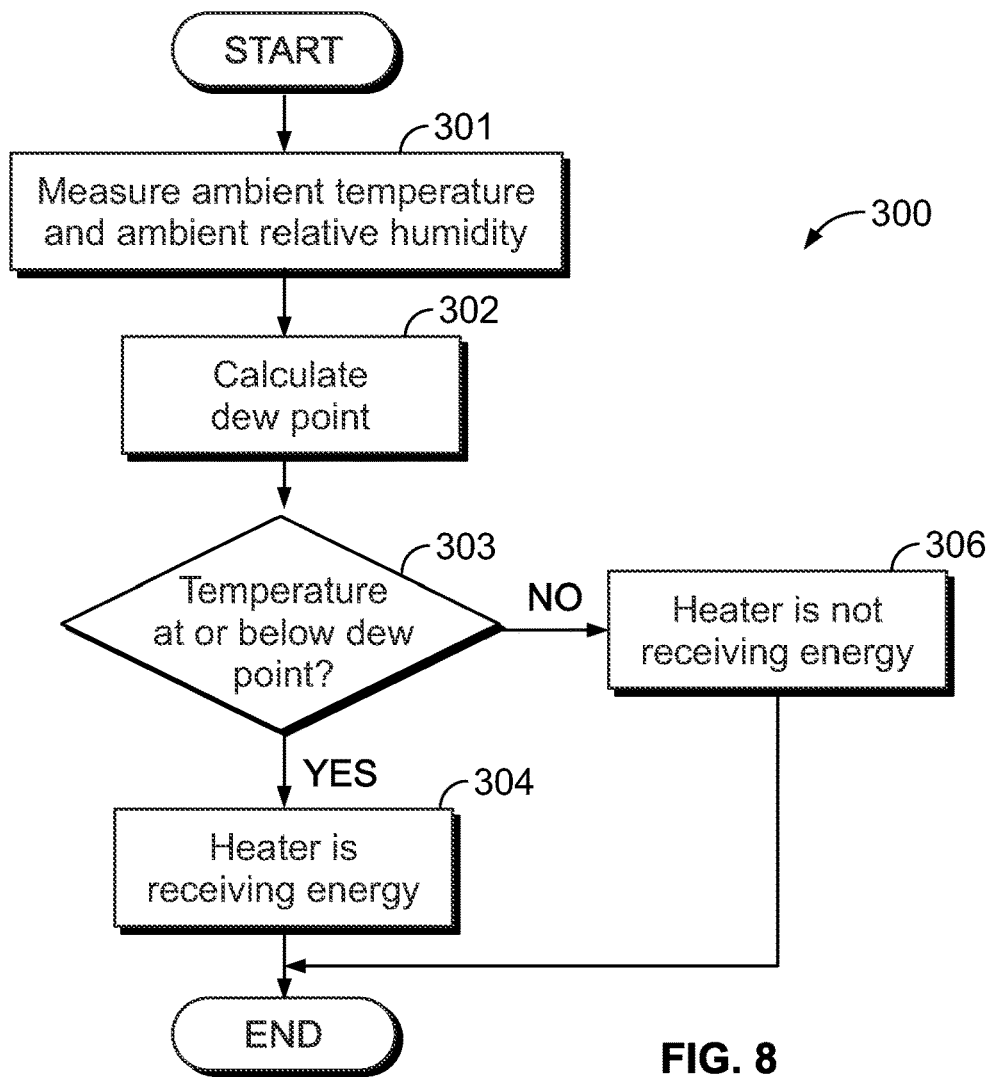
FIG. 8 is a flow diagram of an example method of operating the heater of FIG. 6.

Referring now to FIG. 8, an example of method 300 is provided for heating the reflector 200 of the obstacle detection system 10. The method 300 includes measuring 301 the ambient temperature and the ambient relative humidity using the temperature and humidity sensors 212. The method 300 further includes calculating 302 the dew point from the measured ambient temperature and ambient relative humidity. The method 300 still further includes determining 303 whether the ambient temperature is above the dew point. In response to determining 303 that the ambient temperature is above the dew point, the method 300 further includes refraining from activating 306 the heater 202. The step 306 may involve not turning on the heater 202 if the heater 202 was not energized. Alternatively, the step 306 may involve de-energizing the heater 202 if the heater 202 was currently energized.

In response to determining 303 that the ambient temperature is at or below the dew point, the method 300 includes activating 304 the heater 202. The step 304 may involve continuing to energize the heater 202 if the heater 202 was energized. Alternatively, the step 304 may involve energizing the heater 202 if the heater 202 was not energized.

Figure 9:
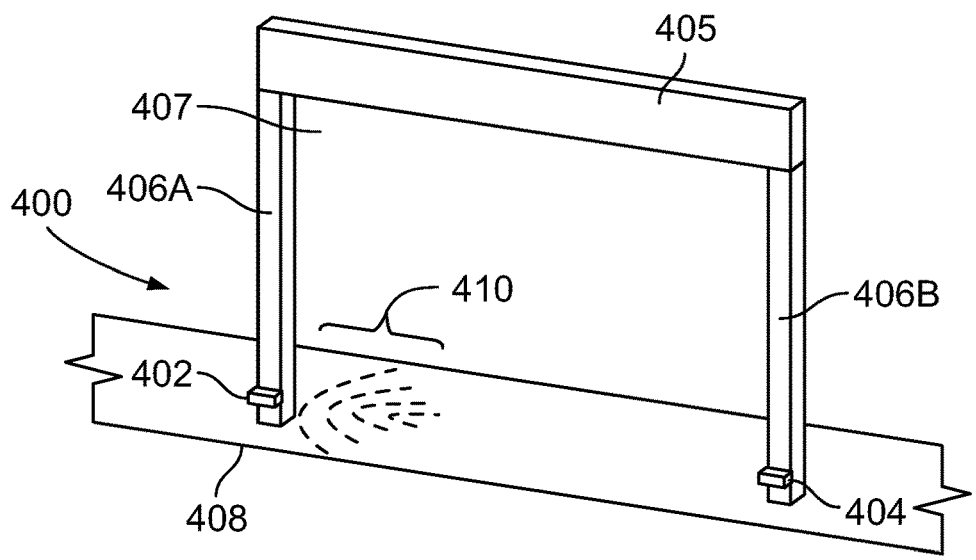
FIG. 9 is a perspective view of a garage door frame and a light emitter and detector showing arcs representative of the intensity of light emitted by the light emitter.

Referring to FIG. 9, an obstacle detection system 400 is provided that includes a light emitter 402 disposed on an interior of one side 406A of an opening 407 of a garage door frame 405. A garage door (not shown) is movable between open and closed positions to obstruct or permit access through the opening 407. The garage door frame 405 may take a variety of configurations and is illustrated to provide an example environment for the obstacle detection system 400.

The system 400 further includes a light detector 404 disposed on the interior of the other side 406B of the garage door opening 407. The light emitter 402 and light detector 404 are mounted to supporting structures such as a metal track (in which rollers of the garage door travel) or wall studs. In some embodiments, the light emitter 402 and the light detector 404 are parallel to and relatively close to a floor 408 of the opening 407. When the light emitter 402 emits a photobeam in a longitudinal direction from one side 406A of the garage door opening 407 to the other side 406B, a portion of the photobeam may contact floor 408 and form light intensity arcs 410 on the floor 408.

Figure 10:
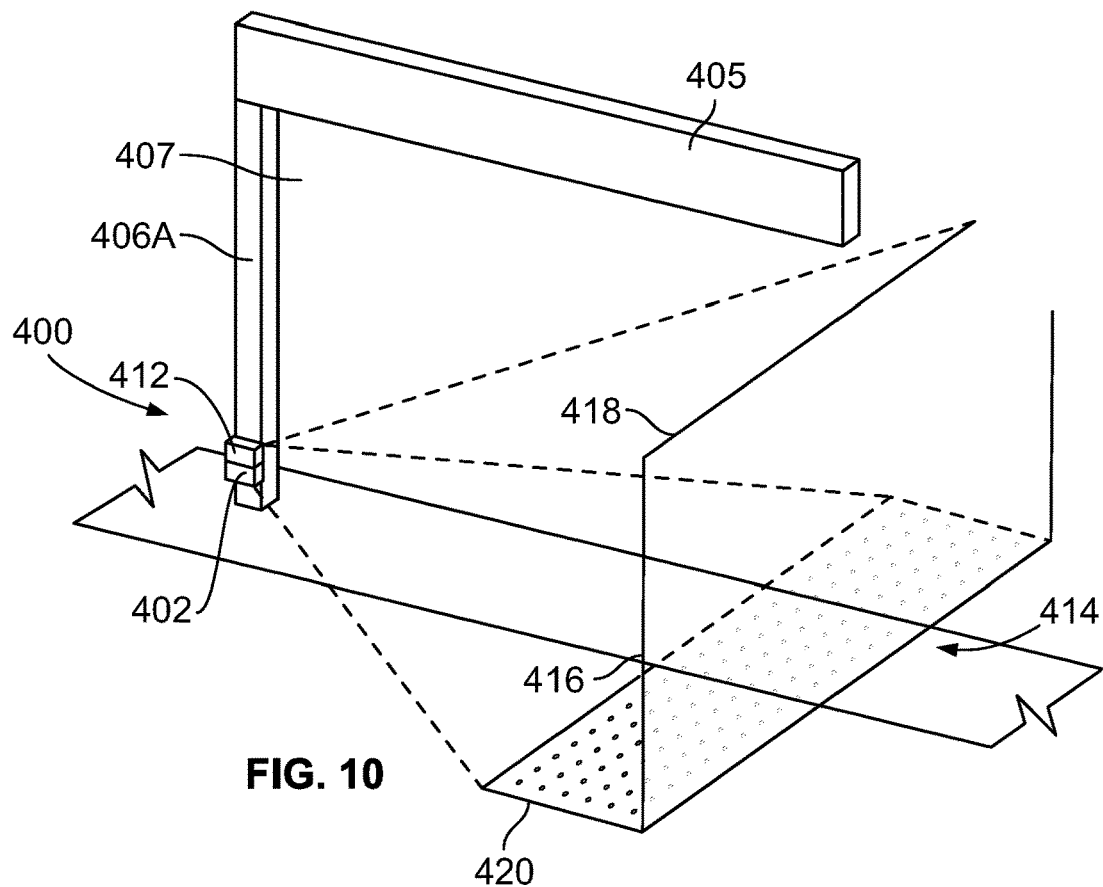
FIG. 10 is a perspective view of a portion of a garage door frame, a light emitter, and a camera showing a field of view of the camera.

Turning now to FIG. 10, the obstacle detection system 400 further includes a camera 412 or camera module (e.g., configured separately or integral with the emitter 402) to monitor the opening 407 of the garage door frame 405 for objects that may obstruct the path of the garage door. In one embodiment, the camera 412 is mounted to the light emitter 402 or is integral therewith. In another embodiment, the camera 412 is mounted to the garage door frame post or another portion of the garage door frame 405 near the light emitter 402.

The camera 412 has a camera field of vision 414 entailing a height 416, a width 418, and a depth 420. The camera field of vision 414 is the area around the opening 407 that the camera 412 is configured to monitor. However, such a large area may not be ideal for an optimal operation of the obstacle detection system 400. For example, if the area monitored is too large, a car parked in the garage may be identified as an obstacle by the camera 412. The obstacle detection system 400 instead narrows the area monitored by the camera 412 to a zone of interest narrowly tailored to the path of the garage door.

Figure 11:
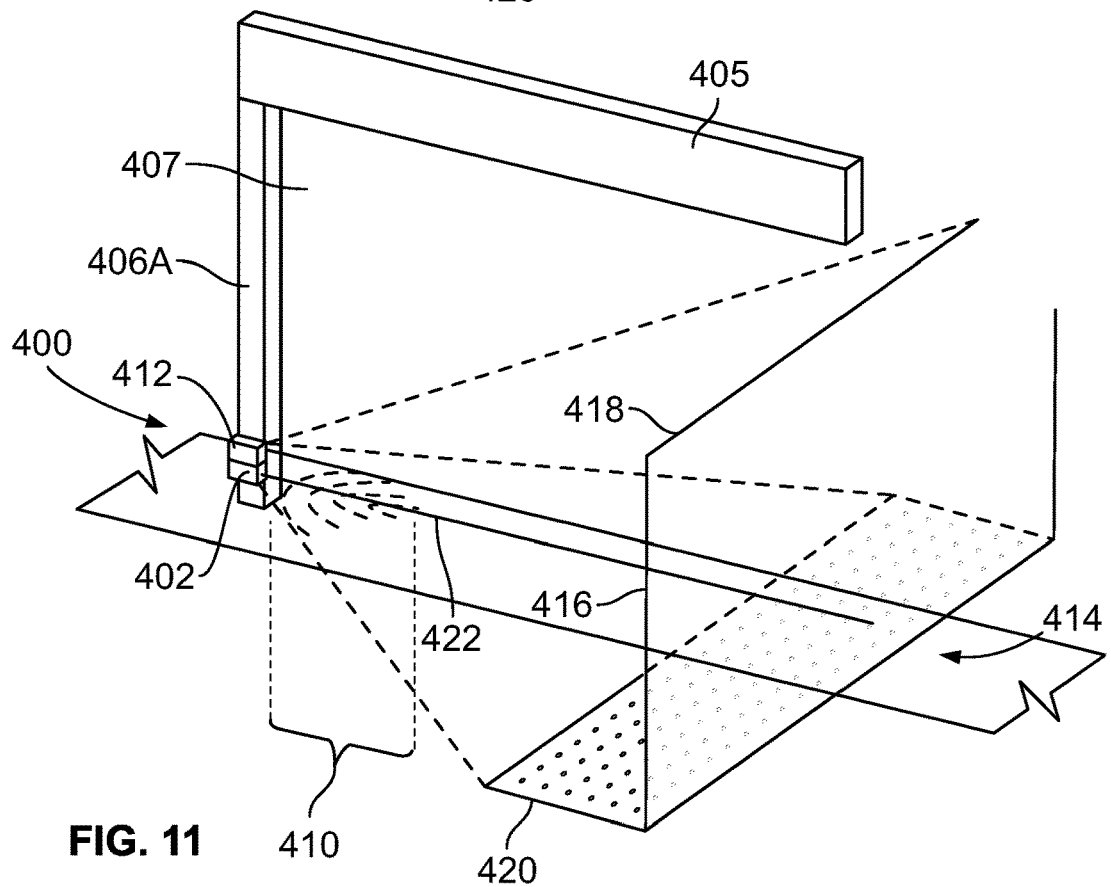
FIG. 11 is a perspective view similar to FIG. 10 showing light intensity arcs of light emitted by the light emitter.

More specifically with reference to FIGS. 9 and 11, the light emitter 402 emits a photobeam toward the light detector 404. Because the light emitter 402 is near the floor 408, light intensity arcs 410 are formed on the floor 408. The light intensity arcs 410 of the photo beam 412 are encompassed within the width 418 and depth 420 of the field of vision 414 of camera 412. The camera 412 may identify a center line 422 of the photobeam that passes through the apexes of the light intensity arcs 410. The camera 412 may narrow its field of view by ignoring optical data beyond a certain number of pixels on either side of the center line 422. The number of pixels correlates to a distance in the area monitored by the camera from the photobeam. In another embodiment, the garage door opener receives the image data from the camera and monitors the zone of interest for objects. The processor of the garage door opener could disregard the image data beyond a certain number of pixels on either side of the center line 422.

Figure 12:
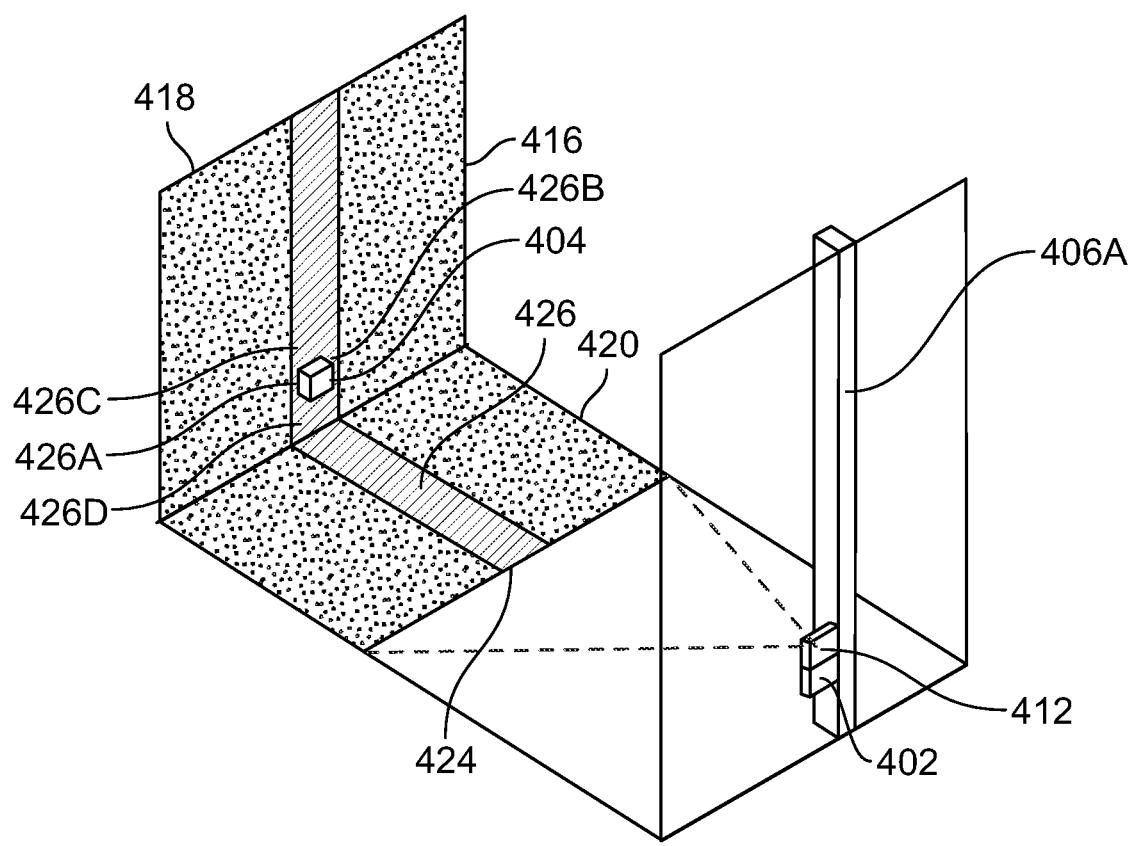
FIG. 12 is a perspective view of the garage door frame and the obstacle detector of FIG. 10 taken from the opposite side of the garage door frame from FIG. 10, FIG. 12 showing the field of view of the camera and a zone of interest of the field of view.

Referring to FIG. 12, the field of vision of the camera 412 is narrowed to monitor a zone of interest 426. The zone of interest 426 has the same height 416 and depth 420 as the camera field of vision 414, but has a width 424 of the zone of interest 426 that is much smaller than the width 418 of the camera field of vision 414. The width 424 of the zone of interest 426 extends laterally and perpendicular to the center line 422 of the photobeam and may be about, for example, 10 inches. The zone of interest 426 includes portions 426A, 426B on opposite lateral sides of the photobeam and portions 426C, 426D above and below the photobeam.

In some embodiments, the light emitter 402 may include an outlet window, where the outlet window has a predetermined width perpendicular to the direction which a light signal is emitted, and the zone of interest 426 has a width 424 larger than the predetermined width of the outlet window of the light emitter 402.

In one embodiment, the camera 412 processes the images monitored in the zone of interest 426 and sends an obstruction signal to the movable barrier operator. The garage door opener stops or reverses the movement of the garage door in response to receiving the obstruction signal from the camera 412. In another embodiment, the garage door opener receives and processes the images from the camera 412, and the garage door opener or movable barrier operator stops or reverses the movement of the movable barrier in response to image processing that indicates an obstruction is in the zone of interest 426.

However, an obstruction signal is not generated or processed if an object is in the camera's field of vision 414 but not in the zone of interest 426. For example, an obstruction signal will not be generated or processed if a vehicle parked in a garage is in the camera's field of vision 414 but not the zone of interest 426, and the movable barrier operator will not stop or reverse the movement of the movable barrier. In contrast, if a portion of the vehicle (e.g., bumper, trunk lid, or hatch) is open and extends into the zone of interest 426, an obstruction signal will be generated even though the portion of the vehicle is above and does not interfere with the light beam emitted by the light emitter 402.

While there have been illustrated and described particular embodiments, it will be appreciated that numerous changes and modifications will occur to those skilled in the art, and it is intended for the present disclosure to cover all those changes and modifications which fall within the scope of the appended claims.

What is claimed is:

1. An obstacle detection system of a movable barrier operator, the obstacle detection system comprising:

a light emitter configured to emit a light signal across an opening;

a camera having a field of view adjacent the opening and configured to monitor a zone of interest within the field of view, the zone of interest being associated with the light signal;

a processor operatively coupled to the camera and configured to determine whether the opening is obstructed based at least in part on whether the camera detects an object in the zone of interest, wherein the light signal includes a geometric characteristic associated therewith, and the field of view of the camera is narrowed based at least in part on the geometric characteristic associated with the light signal; and communication circuitry operatively coupled to the processor, the processor being further configured to cause the communication circuitry to transmit an obstruction signal to the movable barrier operator in response to the camera detecting the object in the zone of interest.

2. The obstacle detection system of claim 1 wherein the light emitter is configured to be mounted at a vertical position above a floor of the opening, and wherein the zone of interest has a height extending above the vertical position of the light emitter.

3. The obstacle detection system of claim 1 wherein the light emitter emits the light signal in a first direction, the light emitter includes an outlet window having a predetermined width perpendicular to the first direction, and the zone of interest has a width larger than the predetermined width of the outlet window of the light emitter.

4. The obstacle detection system of claim 1 wherein at least one of the camera and the processor utilize the light signal to determine a width of the zone of interest.

5. The obstacle detection system of claim 1 further comprising a light detector separate from the camera and configured to receive a portion of the light signal reflected back from the object; and the processor is operatively coupled to the light emitter and the light detector and is configured to further determine whether the opening is obstructed using the light emitter and light detector.

6. The obstacle detection system of claim 1 wherein the light signal is an infrared light signal.

7. The obstacle detection system of claim 1 wherein the geometric characteristic comprises apexes of light intensity arcs of the light signal; and wherein the processor is configured to narrow the field of view of the camera using the apexes of the light intensity arcs of the light signal.

8. A method of operating an obstacle detection system of a garage door operator, the method comprising:

causing a light emitter to emit a light signal across an opening associated with a garage door connected to the garage door operator, wherein the light signal includes a geometric characteristic associated therewith;

narrowing a field of vision of a camera based at least in part on the geometric characteristic associated with the light signal;

operating the camera to monitor a zone of interest;

determining whether the opening is obstructed based at least in part on whether the camera detects an object in the zone of interest; and stopping and/or reversing movement of the garage door in response to determining the opening is obstructed.

9. The method of claim 8 wherein operating the camera to monitor the zone of interest includes monitoring a portion of the zone of interest above the light signal from the light emitter.

10. The method of claim 8 wherein causing the light emitter to emit the light signal includes causing the light emitter to emit the light signal in a longitudinal direction; and operating the camera to monitor the zone of interest includes monitoring a portion of the zone of interest on a lateral side of the light signal.

11. The method of claim 8 wherein causing the light emitter to emit the light signal includes causing the light emitter to emit the light signal in a longitudinal direction; and operating the camera to monitor the zone of interest includes monitoring portions of the zone of interest on opposite lateral sides of the light signal.

12. The method of claim 8 further comprising determining a width of the zone of interest based at least in part on the light signal from the light emitter.

13. The method of claim 8 further comprising:

receiving, at a light detector, a portion of the light signal reflected back from the object; and determining whether the opening is obstructed based on the portion of the light signal received at the light detector.

14. The method of claim 8 wherein the light signal is an infrared light signal.

15. The method of claim 8 wherein the light emitter is on one side of the opening and the camera is adjacent the light emitter on the one side of the opening.

16. A method of operating an obstacle detection system of a garage door operator, the method comprising:

causing a light emitter to emit a light signal across an opening associated with a garage door connected to the garage door operator;

narrowing a field of vision of a camera to a zone of interest associated with the light signal;

operating the camera to monitor the zone of interest;

determining whether the opening is obstructed based at least in part on whether the camera detects an object in the zone of interest;

stopping and/or reversing movement of the garage door in response to determining the opening is obstructed;

wherein causing the light emitter to emit the light signal comprises causing the light emitter to emit a light signal that forms light intensity arcs across the opening associated with the garage door; and wherein narrowing the field of vision of the camera comprises:

identifying a center line that passes through apexes of the light intensity arcs; and narrowing the field of vision of the camera to a zone of interest associated with the light signal by ignoring optical data beyond a certain number of pixels on either side of the center line.

17. The method of claim 16 wherein operating the camera to monitor the zone of interest includes monitoring a portion of the zone of interest above the light signal from the light emitter.

18. The method of claim 16 further comprising:

receiving, at a light detector separate from the camera, a portion of the light signal reflected back from the object; and wherein determining whether the opening is obstructed comprises determining whether the opening is obstructed based at least in part upon the portion of the light signal received at the light detector.

\* \* \* \* \*